United States Patent [19]

Mentzell et al.

[11] Patent Number: 4,509,377

[45] Date of Patent: Apr. 9, 1985

[54] LOAD TESTING

[75] Inventors: Walter J. Mentzell, Upper Burrell Township, Westmoreland County, Pa.; Oscar L. Ganoe, Pennsville, N.J.

[73] Assignee: Mentzell Electric Co., Inc., Apollo, Pa.

[21] Appl. No.: 443,015

[22] Filed: Nov. 19, 1982

[51] Int. Cl.³ .................... G01L 5/00; G01M 19/00
[52] U.S. Cl. ........................... 73/862.56; 73/432 R
[58] Field of Search ............ 73/862.56, 432 V, 158, 73/862

[56] References Cited

U.S. PATENT DOCUMENTS

| 2,414,161 | 1/1947 | Moore | 73/862.65 X |
| 2,421,222 | 5/1947 | Schaevitz | 73/862.65 X |
| 3,110,176 | 11/1963 | Dreier | 73/862.03 |
| 3,722,267 | 3/1973 | Gordon | 73/862.56 |
| 4,374,473 | 2/1983 | Brockman | 73/158 |

FOREIGN PATENT DOCUMENTS

| 224028 | 12/1968 | Sweden | 73/862.56 |
| 499509 | 1/1976 | U.S.S.R. | 73/862.56 |
| 617701 | 7/1978 | U.S.S.R. | 73/862.56 |
| 670847 | 7/1979 | U.S.S.R. | 73/862.56 |
| 821391 | 4/1981 | U.S.S.R. | 73/862.56 |

Primary Examiner—Charles A. Ruehl

[57] ABSTRACT

A method of testing the load lifting ability of a lifting device, including connecting the lifting device to a securement able to resist more force than a weight for which the lifting device is to be tested, operating the lifting device until the force exerted by the lifting device on the securement equals such weight, and displacing the lifting device under load for performing a moving load test.

9 Claims, 11 Drawing Figures

LOAD TESTING

FIELD OF THE INVENTION

The present invention relates to the load testing of lifting devices.

SUMMARY OF THE INVENTION

An object of the invention is to provide improved method, work area, and equipment for load testing lifting devices. By "load testing" is meant subjecting a lifting device to a load equalling a weight for which the lifting device is to be tested. In general, this will be the maximum weight which the manufacturer says the lifting device can lift. The weight can also be the weight of the heaviest object desired to be lifted in the work area where the lifting device is being used.

The above object, as well as other objects which will become apparent in the discussion that follows, are achieved according to the present invention by: a method of testing the load lifting ability of a lifting device, including connecting the lifting device to a securement able to resist more force than a weight for which the lifting device is to be tested, and operating the lifting device until the force exerted by the lifting device on the securement equals said weight; a work area including means for lifting, and securement means for resisting more force from the lifting means than a weight for which the lifting means is to be tested; and a force measuring device, including means for emitting an electrical signal as a function of force applied to it, and means for interposing said signal emitting means between a lifting device and a securement for enabling said signal emitting means to signal force being applied to the securement by the lifting device.

DESCRIPTION OF THE PREFERRED EMBODIMENTS

An example of lifting devices for application of this invention is the crane. A survey of cranes is presented on pages 10-28 to 10-34 of "Mark's Standard Handbook for Mechanical Engineers", eighth edition, McGraw-Hill Book Company, New York, and those pages are incorporated here by reference. Besides the cranes listed there, another type of lifting device for application of this invention is the polar crane such as is installed in the containment building of a nuclear power plant.

In our invention, we use electrical and electronic equipment to do load tests. We do not carry out load tests by picking up large steel or concrete weights. Rather, we perform a *pull* test.

The end results of our test are the same as those of conventional pick-up tests. Both show the following:

(A) The structural strength of the lifting device.
(B) Wire rope condition and lifting capacity.
(C) Bearing condition in hoist, bridge and trolley.
(D) Mechanical load and motor (shoe) brake holding capability.
(E) Device's capability to actually pick up rated load.

However, in our test, there is comparatively little chance of damage to floor or equipment should the lifting device not be able to meet the test conditions. This is in contrast to a pick-up test, where the results of dropping a weight of up to 300 tons can be disastrous.

Figure 1:
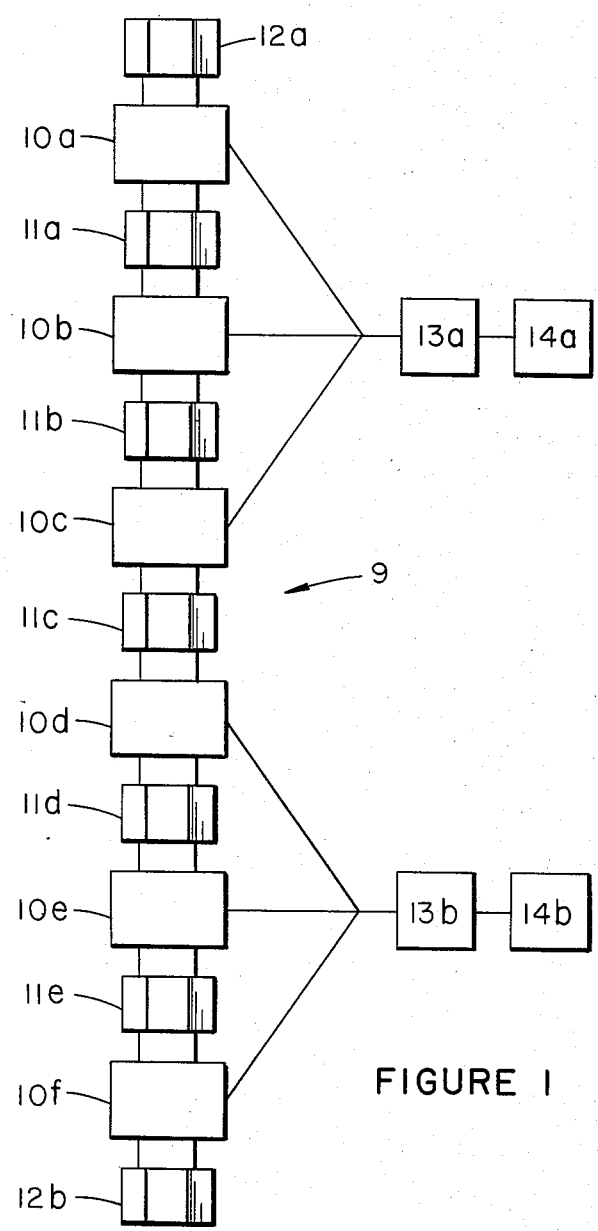
FIG. 1 is an elevational, partly schematic view of a force measuring device according to the invention.

FIG. 1 shows a force measuring device 9 of the invention. It may be used for load testing crane hooks up to 300 tons at 100% and up to 250 tons at 125% in power plants (nuclear and fossil) and all other areas where cranes are employed to lift material or parts. Six load cells 10a to 10f, each of 100,000 pounds capacity, are connected together by coupling nuts 11a to 11e, the threaded ends of the load cells being in threaded engagement with the internal threading of the nuts. Load cells can utilize piezoelectric crystals or strain gages to measure large forces. Clevis attachment 12a is for a clevis for receiving a crane hook, while clevis attachment 12b is for a clevis for receiving the hooks of perhaps six cables from a securement. Summing boxes 13a and 13b receive the electrical signals from the load cells and output their combined results to digital readouts 14a and 14b, which may be battery operated or fed with the local electric power supply and provide whatever power supply may be needed for the load cells. The digital readings on 14a and 14b are added to yield the load.

Figure 2C:
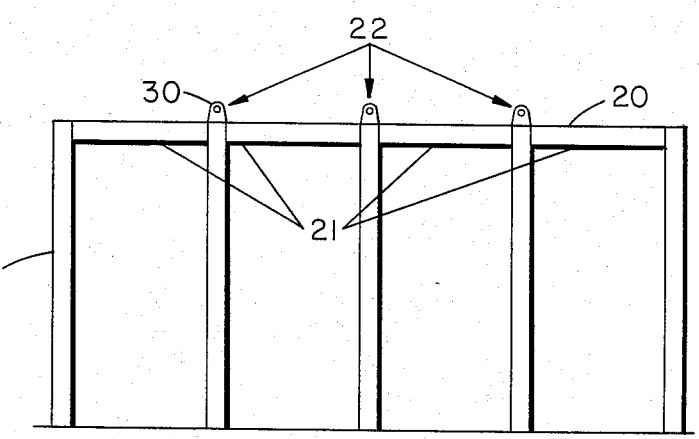
FIG. 2C is a view of a portion of the work area of FIGS. 2A and 2B; the view of FIG. 2C is in the direction of arrow V in FIG. 2A.
Figure 2A:
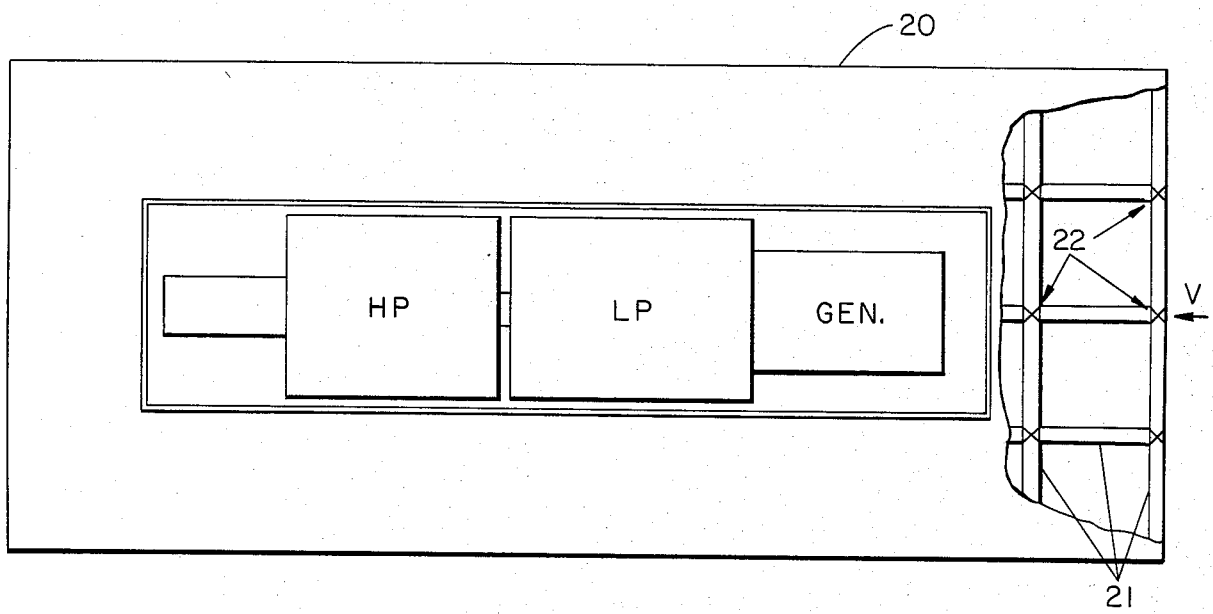
FIG. 2A is a plan view of a work area of the invention.
Figure 2B:
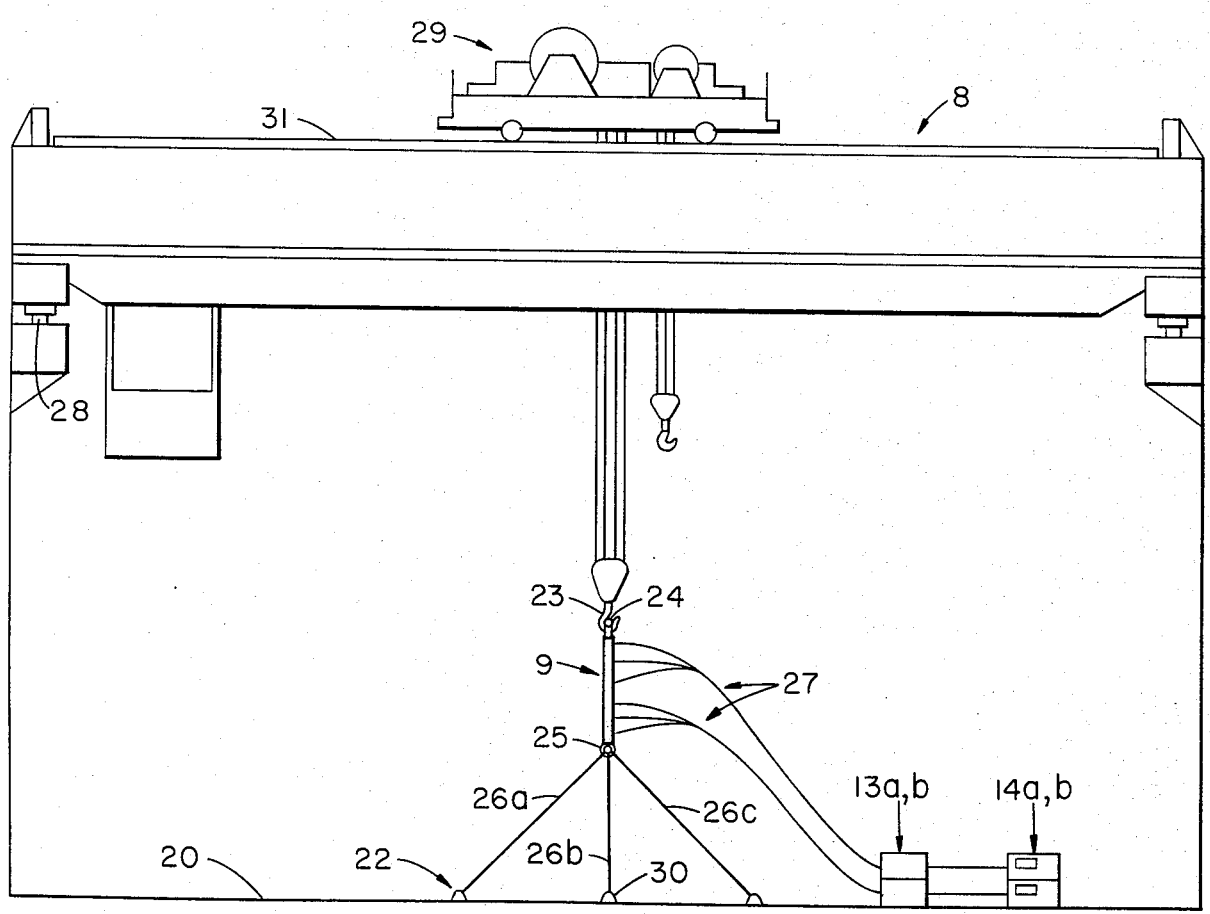
FIG. 2B is an elevational view of the work area of FIG. 2A.

During a load test according to the invention, for example six load cells are coupled together as in FIG. 1 and suspended from the bottom block hook of a crane by the clevis attachment 12a and connected to a securement by the bottom clevis attachment 12b. The securement will desirably be tied to building structure at as many points as possible. This will depend on prior installation by the utility during construction (a one-point securement is possible in such case) or engineered after construction is completed to be incorporated into existing building structure. An example is shown in FIGS. 2A, 2B, and 2C in terms of a basic turbine deck 20 of a nuclear power plant, utilizing a high pressure turbine (HP), a low pressure turbine (LP) and a generator (GEN.). The main building beams 21 provide securement attaching points at the six intersections 22 shown in FIG. 2A. Main hook 23 of crane 8 is shown in clevis 24 at attachment 12a of force measuring device 9, while clevis 25 is connected by six cables, including cables 26a, 26b, and 26c, to securements at intersections 22. Gangs 27 of three electrical cables each are shown going to summing boxes 13a, 13b. A static load test is performed by operating the crane to the desired load as determined by adding the digital readings on readouts 14a and 14b. Inadequate brake holding ability will be shown by a sinking of the digital readings over time. A moving load test is achieved at the desired load by moving the crane perhaps six inches in either direction on the building rails 28 and the trolley 29 perhaps six inches in either direction on the trolley rails 31. This 6-inch displacement out of the vertical pull position represents an insignificant change in the loading conditions considering the distance from the deck 20 to the trolley of 10 to 100 feet, typically 65 feet, yet gives adequate test of the ability of the crane to move under load.

The attaching points will vary in number according to:

(a) the size of the crane employed (b) the capacity of the building structure to withstand pull, and (c) the maximum loading weight of the surrounding area in pounds per square foot. The size of each attaching point would vary also with the maximum tonnage of the crane employed. The area where these attaching points would be located must be located in:

(a) an area relatively free of pedestrian traffic (b) an area where covers and spindles would not cover or not be able to be located either during or after load test, and (c) an area that is open. This means where personnel can move freely in case a sling breaks during load test.

These attachment points can be incorporated in buildings under construction with a minimum of re-engineering or new engineering work. Once these points are located, a load test at any time can be done with a minimum of fuss or trouble and also a minimum of time involved.

Figure 3:
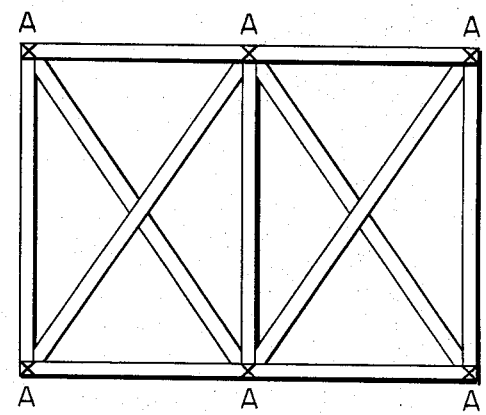
FIG. 3 is a plan view of a modification of the broken-away portion on the right side of FIG. 2A.
Figure 4:
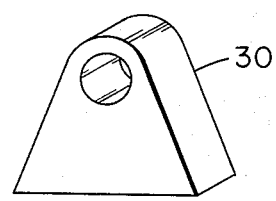
FIG. 4 is an oblique view of an eye used in the work area of FIGS. 2A and 2C.

FIGS. 2C and 3 illustrate the securement principles in somewhat more detail. Each vertical beam A, in conjunction with its associated cross members tie in, is rated at 20,000 pounds each. Six points (6 verticals)×20,000 pounds=120,000 or 60 tons. If the crane is rated at 40 tons, the six point pull would allow a 125% static pull load test. Points X indicate where pull eyes are located, one such pull eye 30 being shown in greater detail in FIG. 4. The pull eyes are welded to the structural joints at points X (FIG. 3) and become part of the structure itself. Any difference in height would depend on thickness of slab floor.

Note that a lifting device must be inspected before load test to make sure brakes are operating properly.

Figure 5:
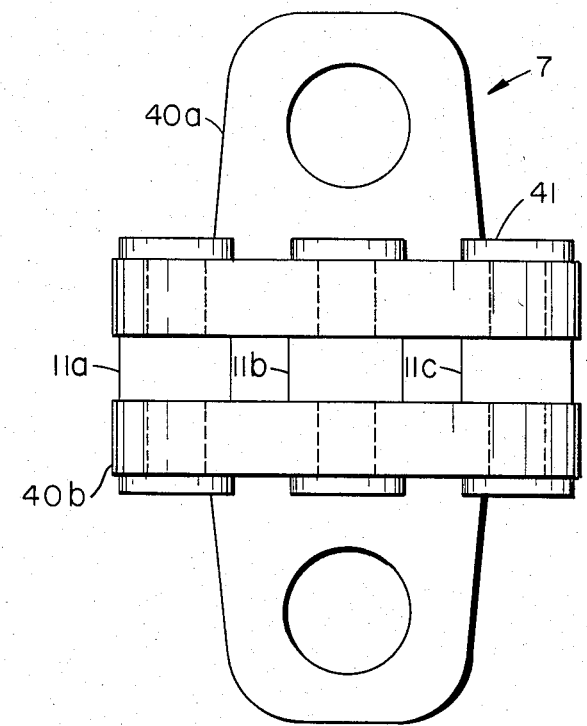
FIG. 5 is a view as in FIG. 1 of an alternate force measuring device.
Figure 6A:
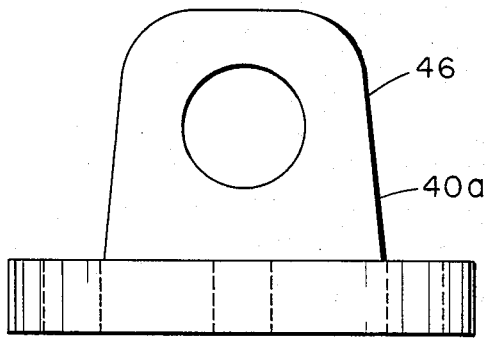
FIGS. 6A and 6B are respectively elevational and top views of a portion of the structure of FIG. 5.
Figure 7A:
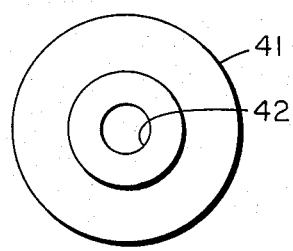
FIGS. 7A and 7B are respectively top and elevational views of a portion of the structure of FIG. 5.
Figure 6B:
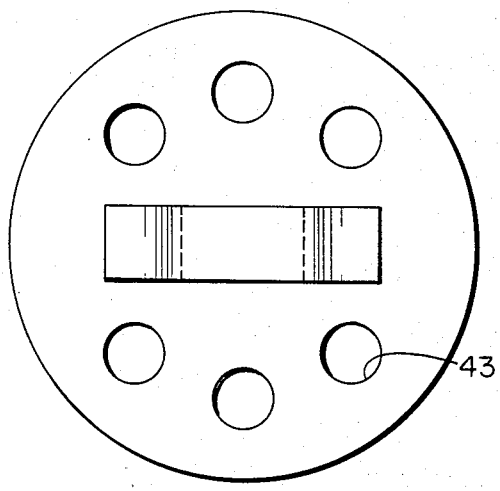
Figure 7B:
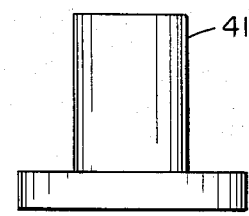

FIG. 5 shows an alternate force measuring device 7. It carries six load cells 11a to 11f which are screwed tight against hook receiver terminals 40a (FIGS. 6A and 6B) and 40b using adapters 41 (FIGS. 7A and 7B) having an internally threaded bore 42 for receiving the threaded ends of the load cells. Force measuring device 7 may be assembled by first tightly screwing the load cells against terminal 40a using adapters 41 in bores 43 (FIG. 6B), then placing terminal 40b onto the load cells such that the other ends of the load cells are in bores 43 of terminal 40b, then threading adapters 41 onto the ends of the load cells and screwing the adapters 41 until they come tight against the plate 45 of terminal 40b. Each terminal has an eye 46 (FIG. 6A), one (e.g. that of 40a) being for a crane hook 23 (FIG. 2B), the other (e.g. that of 40b) being for attachment of securement cables 26 (FIG. 2B).

It will be understood that the above description of the present invention is susceptible to various modifications, changes and adaptations and the same are intended to be comprehended within the meaning and range of equivalents of the appended claims.

What is claimed is:

1. A method of testing the load lifting ability of a lifting device, comprising connecting the lifting device to a securement able to resist more force than a weight for which the lifting device is to be tested, operating the lifting device until the force exerted by the lifting device on the securement equals said weight, and displacing the lifting device under load for performing a moving load test.

2. A method as claimed in claim 1, the lifting device comprising a crane.

3. A method as claimed in claim 2, the crane being installed in a building.

4. A method as claimed in claim 1, further comprising connecting a force measuring device between the lifting device and the securement for signalling the force being exerted.

5. A method as claimed in claim 4, the force measuring device comprising a load cell emitting an electrical signal as a function of load.

6. A method as claimed in claim 1, the securement being stationary, the lifting device being movable, further comprising moving the lifting device to the securement for the test.

7. A method as claimed in claim 1, the line of force exerted by the lifting device on the securement being vertical for a static load test, the displacing bringing the line of force out of vertical.

8. A method as claimed in claim 1, the displacing being directed laterally to the line of force exerted by the lifting device on the securement.

9. A method as claimed in claim 1, the displacing being directed about perpendicularly to the line of force exerted by the lifting device on the securement.

* * * * *